United States Patent [19]

Derby et al.

[11] Patent Number: 5,426,637
[45] Date of Patent: Jun. 20, 1995

[54] METHODS AND APPARATUS FOR INTERCONNECTING LOCAL AREA NETWORKS WITH WIDE AREA BACKBONE NETWORKS

[75] Inventors: Jeffrey H. Derby, Chapel Hill, N.C.; Willibald A. Doeringer, Langnau; Harold D. Dykeman, Rueschlikon, both of Switzerland; Liang Li, Chapel Hill; Haldon J. Sandick, Durham; Ken V. Vu, Cary, all of N.C.

[73] Assignee: International Business Machines Corporation, Armonk, N.Y.

[21] Appl. No.: 992,857

[22] Filed: Dec. 14, 1992

[51] Int. Cl.$^6$ .............................................. H04L 12/66
[52] U.S. Cl. .................................................. 370/85.13
[58] Field of Search ............... 370/85.13, 85.14, 85.1, 370/94.1, 94.2, 60, 60.1; 364/200, 240.8, 940.81, 940.62; 395/325

[56] References Cited

U.S. PATENT DOCUMENTS

| | | | |
|---|---|---|---|
| 5,018,137 | 5/1991 | Backes et al. | 370/85.13 |
| 5,086,426 | 2/1992 | Tsukakoshi et al. | 370/85.13 |
| 5,179,555 | 1/1993 | Videlock et al. | 370/85.13 |
| 5,214,646 | 5/1993 | Yacoby | 370/85.13 |
| 5,251,205 | 10/1993 | Callon et al. | 370/60 |
| 5,251,213 | 10/1993 | Videlock et al. | 370/85.13 |
| 5,309,437 | 5/1994 | Perlman | 370/85.13 |

OTHER PUBLICATIONS

R. Letson, "LAN-WAN-Smater and Faster Links," *Systems Integration*, pp. 32–36, Dec. 1990.
M. Grimshaw, "LAN Interconnection Technology," *Telecommunications*, pp. 37–46, Jun. 1991.
R. L. Sharma, "Interconnecting LANs" *IEEE Spectrum*, pp. 32–44, Aug. 1991.

*Primary Examiner*—Douglas W. Olms
*Assistant Examiner*—Ajit Patel
*Attorney, Agent, or Firm*—Gerald R. Woods; Robert O. Nimtz

[57] ABSTRACT

A system for interconnecting widely separated local area networks (LANs) by means of a wide area network (WAN) utilizes network level facilities to establish a connection through the wide area network and to create connection table entries at the WAN access point which allow subsequent data frames to be transmitted through the wide area network without such network level operations. More particularly, the various LANs are combined into search groups, represented by address prefixes, to which LAN-initiated connection requests can be broadcast and which can respond so as to establish the data path connections. This system has the connection flexibility of a prior art router and, at the same time, the low overhead of a prior art bridge.

14 Claims, 6 Drawing Sheets

METHODS AND APPARATUS FOR INTERCONNECTING LOCAL AREA NETWORKS WITH WIDE AREA BACKBONE NETWORKS

TECHNICAL

This invention relates to digital communication networks and, more particularly, to efficient interconnection of local area networks (LANs) by way of wide area networks (WANs).

BACKGROUND OF THE INVENTION

It has become common to interconnect a plurality of user digital facilities with a "local area network," i.e., a digital broadcast transmission system located in a restricted geographical area and designed to interconnect the facilities of a single commercial or academic community of users. Such local area networks, LANs, have a variety of different configurations and employ many different transmission protocols. Ethernet ® and token rings are two of the major types of local area networks that are available today. These local area networks (LANs) use various types of digital packets, various signaling protocols and various error detection and correction schemes to insure accurate transmission of digital streams between the users of the local area network. Due to limitations on transmission distance with LAN technology, LAN networks tend to be very restricted in geographical size, typically limited to a university campus or commercial location. Such LAN characteristics are well known and will not be further described here.

It has become increasingly important to interconnect such local area networks together to permit users of different LANs to communicate with each other. Two general types of direct LAN interconnections have been made available, depending on the type of LANs being interconnected. These two interconnection technologies are known as routers and bridges. In general, routers are used to interconnect different configurations of LANs (Ethernet to token ring, for example), over arbitrary distances, while bridges are used to interconnect locally like configurations of LANs (token ring to token ring, for example). Using the Open Systems Interconnection (OSI) model ("Information Processing Systems—Open Systems Interconnection—Basic Reference Model," *ISO International Standard* 7498, First Edition, Oct. 15, 1984), routers operate at layer 3 of the model (the network layer) while bridges operate at layer 2 (the data link layer, or more precisely, the Medium Access Control (MAC) layer). More specifically, routers at layer 3 terminate the local data link layer protocols and utilize network layer addresses and data frame restructuring to communicate across the WAN interconnection. Layer 3 architectures in which such routers might find use include such well known systems as TCP/IP Internet Protocols (*Internetworking with TCP/IP-Principles, Protocols and Architecture*, Comer, Prentice-Hall, 1989), OS13 ("Intermediate System to Intermediate System Intra-Domain Routing Protocol for Use in Conjunction with the Protocol for Providing the Connectionless-Mode Network Service," ISO 8473, ISO/DIS 10589, 1990), and SNA ("System Network Architecture—Format and Protocol Reference Manual," IBM Document SC30-3112, 1980).

Bridges at layer 2, on the other hand, utilize the MAC address of the destination from the source LAN itself and thus communicate directly, without frame restructuring, across the interconnection between similar LAN media. That is, since the LANs on both sides of the interconnection use the same protocols, the frames need not be converted at the common LAN interface, but merely delivered across the interconnection from the source LAN to the destination LAN without significant conversion.

More recently, wide area networks, spanning large geographical areas including national and international coverage, have become available for transmitting digital data streams over long distances between users of the system with very high transmission rates, matching, or even exceeding, those of present LANs. Such wide area networks (WANs) have their own transmission, signaling and error handling facilities which generally do not match those of any local area network. It has become a significant problem to transparently interconnect two or more of the LANs described above by means of a WAN backbone in order to permit users on the different LANs to communicate directly with each other. The difficulties in such interconnections are a result, in large part, of the differences in the protocols used by the various LANs, the further different protocols of the WANs themselves, and the widely varying addressing schemes employed by the various LAN protocols.

This proliferation of different protocols for the transmission of digital data packets between geographically separated users has required router style interfaces between the various interconnection systems (LANs and WANs). Such routers, however, are expensive to design and maintain and, moreover, require expensive and time-consuming overhead in order to make all of the high level conversions required at each of the network interfaces. Such overhead interferes severely with the throughput of such systems and significantly increases the cost of interconnecting local area networks by means of the increasingly available wide area networks.

SUMMARY OF THE INVENTION

In accordance with the illustrative embodiment of the present invention, the overhead required for interconnections between local area networks via wide area networks is reduced by utilizing high level (OSI layer 3) interactions for interconnection signaling, but utilizing low level (OSI layer 2) interactions for the actual data transmissions across the wide area network. More particularly, if the widely separated LANs utilize compatible MAC protocols, data packets are exchanged between them across the WAN backbone based solely on MAC-layer information with no significant conversion. The call setup and other control messages, on the other hand, must be analyzed at the respective protocol's network layer in order to locate the remote communication partner by means of the WAN directory services, to ensure sufficient compatibility between the MAC protocols at the source and destination LANs, and to establish a suitable connection across the WAN to serve the communicating LAN stations. The present invention is, in general, directed toward the use of high level signaling combined with low level data transfer.

More particularly, requests for connections from a source LAN are analyzed at the source access node to the WAN, using resources at OSI network layer 3 to determine the location and the MAC protocol of the destination LAN. If the destination can be located by the WAN directory services and if these protocols match (highly likely between LANs wishing to communicate with each other), a connection is calculated through the WAN to a WAN access node attached to the destination LAN. After assuring an optimal connection through the WAN, the source access node and the destination access node create connection table entries at both ends of the WAN connection which can be used to convert a source LAN data frame into a form suitable for packet transmission across the WAN connection and, conversely, convert the received packet into a form suitable for delivery to the local LAN. These connection table entries are symmetrical so that data frames can be exchanged in both directions. The connection tables can be invoked at OSI data link layer 2, significantly reducing the overhead involved in delivering data frames across the WAN.

Using the "high signaling level, low data exchange level" paradigm of the present invention, all of the flexibility of the router form of interconnection between source and destination LANs is preserved while, at the same time, securing all of the simplicity and speed of the bridge form of interconnection. This approach to the interconnection of LANs over a WAN optimizes the use of all of the resources of the WAN to provide simple and fast interconnections.

It is to be noted that, although the present invention will be described in terms of interconnecting local area networks (LANs) by means of wide area networks (WANs), the high signaling level, low data exchange level approach is also suitable for interconnecting LANs by means of "metropolitan area networks" (MANs), and for interconnecting MANs by means of WANs. Indeed, the present invention can be described as a technique for conserving the resources of any relatively wide area network which is used to interconnect two more localized networks.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
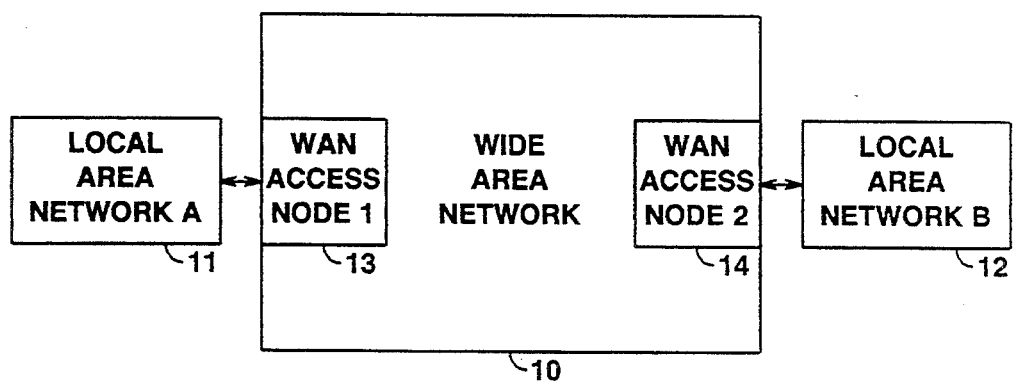
FIG. 1 shows a general block diagram of a wide area network used to interconnect two local area networks and in which the interconnection system of the present invention might be used.

Before proceeding to a description of the present invention, the prior art mechanisms for interconnecting local area networks (LANs) will be described. The principal LANs currently available are token rings, typified by IBM's Token Ring and Fiber Digital Data Interconnect (FDDI) System, and backbone switched bus systems, typified by Ethernet ®. Such LANs are of limited geographical size due to signal propagation range, delay distortion and other digital transmission limitations. It has therefore become of increasing importance to interconnect such LANs to enable users of different LANS to communicate directly with each other. Attempts to use repeaters to extend the area over which LANs can operate are limited by the inherent delay distortions involved in transmission facilities with propagation delays large compared to the duration of signals being transmitted.

Devices currently available for the interconnection of LANs are MAC (media access control) data link layer bridges and network layer routers. MAC bridges provide a very fast, high throughput data path with frame forwarding determined completely by the contents of the MAC header. The destination address in the MAC header is located in a flat, unstructured address space, making it difficult to partition the address space into segments suitable for network management, routing and bandwidth control. More importantly, LANs initiate a connection by broadcasting a connection setup request message across the entire network, leading to an explosion of broadcast traffic on large networks, and interrupting end stations which must respond to such connection request messages. Such broadcast signaling procedures on LANs are known as "discovery procedures" which can consume significant portions of the available bandwidth as the LAN population grows, and can inflict on the network what is commonly referred to as "broadcast storms" which severely restrict the transmission capacity of the network.

MAC bridges have the advantages of simplicity, since every packet uses the same address formats irrespective of the network layer protocols, since packets are forwarded without decomposition, permitting easy decisions (to forward or not to forward), and being less expensive due to these advantages. On the other hand, bridges must look at all packets to determine routing, leading to more likely overloads, will generally not tolerate loops (multiple paths) in the network, will not permit transmission redundancy or load splitting and hence require the disablement of redundant connections by some form of "spanning tree" algorithm. Finally, a bridge must pass on all broadcasts since it does not contain the resources to determine suitability of forwarding.

Routers, on the other hand, operate at the network layer of the supported protocols and utilize network layer addresses (logical addresses) to forward packets. Such logical addresses are generally hierarchical in nature, readily supporting network partitioning and permitting packet flow control and traffic management. Only the packets addressed to the local router need be examined, reducing the possibility of traffic overload by broadcast storms. On the other hand, routers are more complicated and difficult to design than bridges. For each packet, the network header must be examined and decoded to obtain its destination address, requiring customization for every different protocol, requiring a routing table to translate the logical addresses into subnet addresses, and hence being more expensive. Moreover, such high levels of per packet processing severely limit the router throughput capability.

It has become increasingly common to package both a bridge and a router in the same device, called a "brouter," but where each sub-device operates independently of the other. The router portion is used if the brouter understands the network layer protocols, and the bridge is used otherwise.

A large number of wide area networks (WANs) are becoming available to interconnect widely separated users. Such WANs utilize a plurality of switching nodes at which packets are routed on to the next node depending on routing information in the packet header. Routes are precalculated depending on loading, facility availabilities and special needs of the connection. One of the most important problems of the present time is to efficiently use the new WANs to interconnect the large number of existing LANs. The present invention is directed toward a solution to this problem.

In FIG. 1 there is shown a general block diagram of wide area network (WAN) 10 being used to interconnect two local area networks (LANs) 11 and 12 and in which the interconnection system of the present invention might find use. In order to accomplish these interconnections, a plurality of WAN access nodes, including access nodes 13 and 14, are used at the interface between the LANs 11 and 12 and WAN 10. Access nodes 13 and 14 provide the mechanisms to accept control and data frames from the connected LANs 11 and 12 and to perform all of the control functions necessary to effect the interconnection between LANs 11 and 12.

Figure 2:
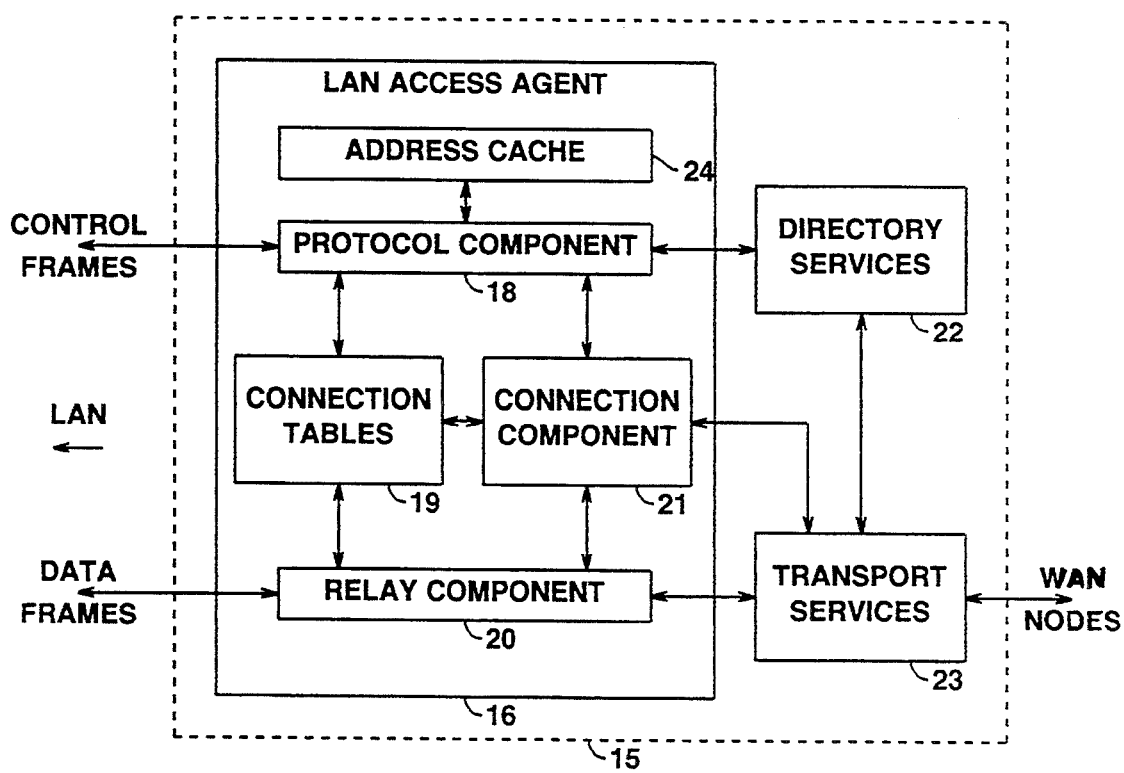
FIG. 2 shows a general block diagram of a wide area network access node which might be used to interface the local area networks of FIG. 1 with the wide area network in accordance with the present invention.

In FIG. 2 there is shown a more detailed block diagram of one of the WAN access nodes 13 and 14 of FIG. 1. WAN access node 15 of FIG. 2 comprises a LAN access agent 16, used to directly interface with a local area network accessed at the left of FIG. 2, directory services unit 22, used to translate logical addresses of network layer entities into the WAN address of a suitable destination WAN access node and destination MAC address, which can be used to actually route data packets to the destination LANs, and transport services unit 23 which provides the services necessary to encapsulate LAN frames for transmission across the WAN 10 of FIG. 1. The constituents of the WAN access node 15 of FIG. 1 can be implemented in special purpose circuitry but, in the preferred embodiment, are implemented in software which can be executed by a large class of general purpose computers.

More particularly, the transport services unit 23 satisfies the communication requirements set by its users in order to optimally match the quality of service requirements of the users to the underlying transmission facilities. The major functions of unit 23 include the selection of optimum routes and the maintenance of the desired quality of service parameters. The users of these services are the LAN access agents such as agent 16, identified by suitable WAN addresses. In general, transport services unit 23 provides low latency, high-bandwidth unicast and multicast connections through the wide area network, including real-time services, bandwidth reservation and multicasting between groups of transport users which can be dynamically created and identified by a group address.

Directory services unit 22 provides the distributed procedures required to dynamically map the addresses of network layer entities in stations attached to the interconnected LANs into the WAN transport addresses of peer access agents through which communication with the respective stations can be accommodated, and into the pertinent destination MAC addresses of the LAN stations where the respective entities reside. Directory services unit 22 relies on the registration of the necessary addressing information by the local LAN access agents in the form of suitable address prefixes as employed by the external protocols executed on the LAN, thus indicating reachability of stations identified by network layer addresses derived from such prefixes. If the LAN protocol incorporates a network layer with structured addresses, the access agent learns these provided prefixes by dynamically participating in the local protocols or by querying the local configuration. If a LAN protocol uses a flat, unstructured addressing scheme, the WAN-attached LANs are arbitrarily and administratively partitioned into selected groups which are assigned virtual address prefixes unknown to the local protocol but used by the access agents to locate destinations as in the case of structured addresses described above. When requested by a LAN access agent, directory services unit 22 performs address resolution among the group of LAN access agents which support a specified protocol and have previously registered the specified address prefix. (See "Efficient, Real-Time Address Resolution in Backbone Networks," by W. Doeringer et al., IBM Research Report RZ2357, July, 1992.)

LAN access agent 16 forms the point of attachment between the WAN and the attached external LANs. The principal purpose of access agent 16 is to mediate between the external LAN protocols and the protocols available on the backbone WAN used to achieve the transparent inter-LAN connection. LAN access agent 16 comprises a protocol component 18 which interacts with control frames from the LAN to set up, take down and otherwise control the connection to the remote LAN. A relay component 18 of access agent 16 interacts at the MAC-layer level with data frames from the LAN to forward such data frames through WAN 10. Connection tables 19 are created and augmented to provide the information necessary to control separate WAN connections for each active pair of source and destination MAC addresses. More specifically, connection tables 19 hold entries that map pairs of MAC addresses (the source and destination MAC addresses found in a MAC-layer packet header) to the WAN connection that was previously established to relay the MAC frames between the two LAN stations identified by these MAC addresses. The entries in the connection tables 19 include no awareness of network layer information.

Connection component 21 invokes transport services unit 23 to establish and manage suitable WAN connections for the relaying of LAN data frames as requested by the protocol component 18. The separation of control and data frames shown in FIG. 2 is based only on information in the MAC layer headers. Most typically, control frames are comprised of MAC frames destined to a LAN broadcast or group address, whereas point-to-point MAC frames are treated as plain data frames. In every case, some mechanism is provided to distinguish between control and data frames.

The protocol component 18 is cognizant of the local LAN protocol formats and semantics and is used to convert between such local LAN protocols and its broadcast signaling procedures and the services provided by the other components of the LAN access agent 16 and by the WAN components. In this way, the local protocol particulars are hidden from the balance of the wide area network. For example, when the LAN protocol initiates a search procedure, the protocol agent 18 registers, if present, the reachability information for the local resources embedded in the respective protocol frames (i.e., the address prefixes) with directory services unit 22 and initiates searches for resources which are not available locally. Reciprocally, directory services unit 22 invokes the protocol components 18 in the appropriate access nodes in order to search the local LANs for the location of a particular destination LAN station. The results of such searches may then be cached by the WAN access agents in address cache 24 connected to protocol component 18, used to expedite the processing of future search procedures. That is, address cache 24 stores network layer addresses of network layer entities residing in stations attached to local and remote LANs, along with supporting information. For entities attached locally, the supporting information is the respective MAC addresses. For entities in LAN stations on remote LANs, the supporting information is the WAN transport addresses of the WAN access agents through which these entities may be reached. In other words, the address cache 24 contains information which was acquired via WAN directory services 22 and LAN searches.

The connection component 20 establishes new WAN connections upon request from protocol component 18, enforces local policy constraints regarding the reuse of existing connections and creates entries in connection tables 19 which are used by relay component 20 to perform MAC-layer data relaying as will be described below. Such connection table entries map the MAC-layer addressing information (typically pairs of MAC source and destination addresses) into the corresponding WAN connections between the LAN access agents through which the source and destination LAN stations are interconnected. The connection component 20 also adapts to changes in bandwidth requirements and performs garbage collection of connections and connection table 19 entries.

The relay component 21 of LAN access agent 16 performs the forwarding of data packets between the local LAN and the backbone WAN. Based solely upon the MAC-layer addressing information in the received LAN data frame, the connection component 21 utilizes an entry in the connection tables 19, established by protocol component 18, to encapsulate the MAC-layer frame and to forward the data frame through the previously defined WAN connection.

The present invention utilizes the access agent architecture of FIG. 2 to provide a "high-level signaling, low-level switching" scheme for interconnecting LANs through a backbone WAN. In general, the LAN access agents monitor the local LAN broadcast search procedures and extract pertinent address information from the network layer signaling information. From this, a suitable address prefix is derived which is then presented to directory services 22 to guide the locate procedures for the looked-for resource, thus minimizing the signaling overhead in the WAN backbone. When the requested resource is located, exactly one LAN access agent at the source LAN and one access agent at the destination LAN are chosen to support the relaying of subsequent point-to-point LAN frames exchanged between the LAN end stations. The selected LAN access agents establish between themselves a WAN transport connection with suitable bandwidth guarantees and service characteristics. The LAN access agents then perform a reliable message exchange (such as over a long-lived WAN connection established between these agents to perform such control exchanges) to communicate all information required to establish the required entries in their connection tables. These connection table entries map the pair of MAC addresses of the source and destination LAN stations into a corresponding WAN connection. Any subsequent point-to-point traffic between the two LAN stations is encapsulated and routed through this WAN connection across the backbone WAN. That is, any point-to-point LAN frame received by either LAN access agent is forwarded across the selected WAN connection to the other LAN access agent which, in turn, forwards the frame onto the local LAN for delivery to the destination LAN end station.

Figure 3:
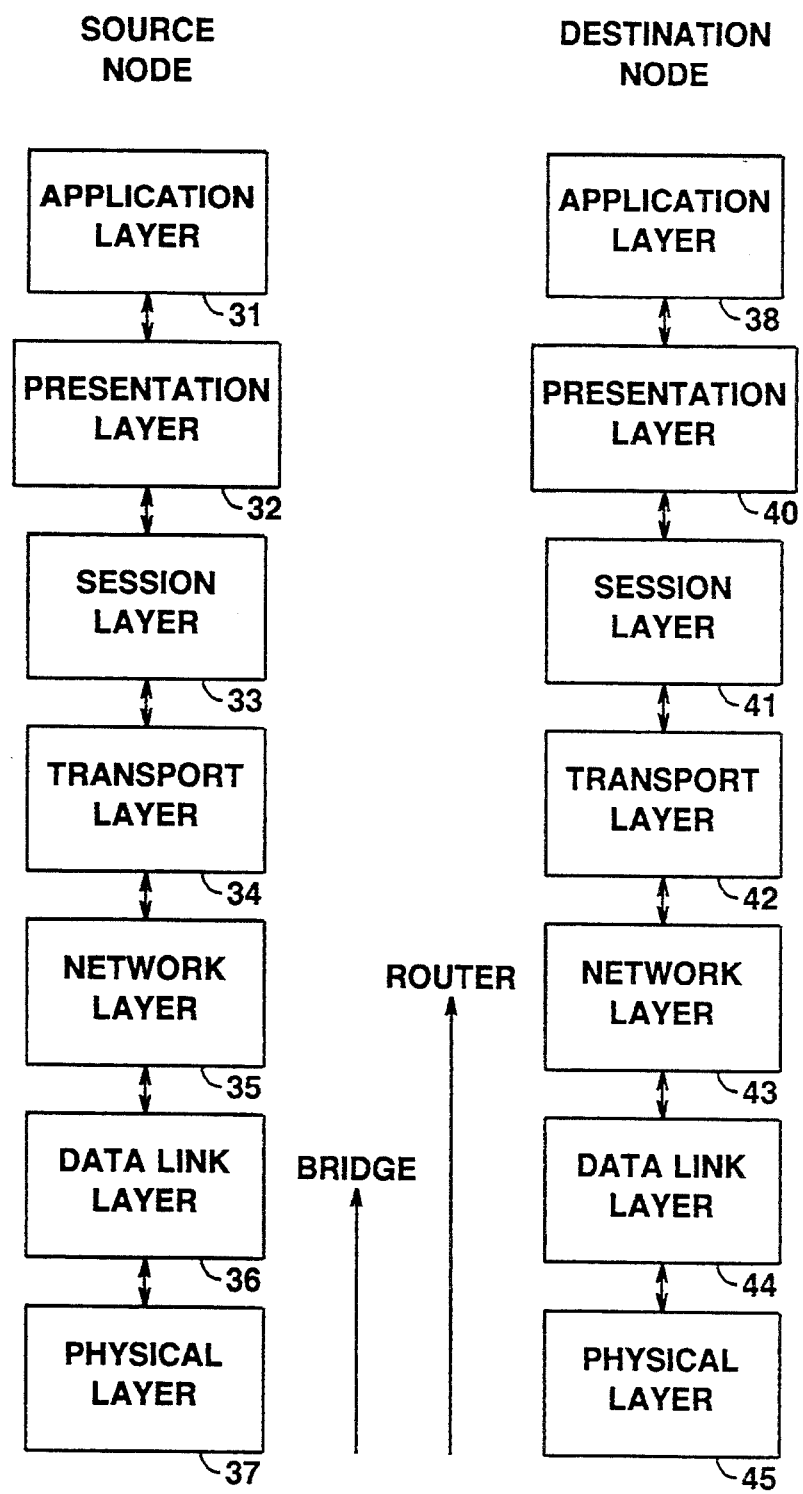
FIG. 3 shows a schematic block diagram of the Open Systems Interconnect (OSI) Reference Model for a layered communications architecture showing the difference between the bridge and router approaches to local area network interconnection.

FIG. 3 shows a schematic diagram of the traditional Open Systems Interconnection (OSI) reference model disclosed in "Information Processing SystemsOpen Systems InterconnectionBasic Reference Model," *ISO International Standard* 7498, First Edition, Oct. 15, 1984. As can be seen in FIG. 3, communication between two different users at a source node of a packet communications network and a destination node on that same network involves the use of up to seven layers of protocol. Each of the seven layers is isolated from the others but meets interface standards that allow each layer to communicate with the adjacent layers. This layered approach permits the implementation of the individual layers to be flexible while at the same time providing the same standard functionality and insuring the inter-layer communications can take place. Communication between the source node user and the destination node user is thus made possible by communication between the seven layers of the OSI model, observing the inter-layer protocols.

The bottom or lowest layer, called the physical layer and represented by boxes 37 and 45, provides actual connections across a physical medium between the two user systems. Such physical connections are made by way of electrical or optical signals propagating on the physical medium between the two systems in accordance with any of the well known transmission protocols. These physical layer transmission protocols define the signal pulse shapes, pulse repetition rates, pulse amplitudes, and so forth. The next higher layer, the data link control (DLC) layer, represented by boxes 36 and 44, controls the delivery of raw data between the nodes in the network. The DLC layer protocols include link identification, synchronization, error correction, packet sizes, framing, and so forth. In most networks, fundamental communication errors are detected and corrected at the data link control layer by means of data retransmission or logical data manipulation for error recovery.

The next higher protocol layer above the data link control layer is called the network layer, represented by boxes 35 and 43 in FIG. 3. The network layer is the highest layer of the communications network node or subnode, meaning that all layers above this layer communicate on an end-to-end basis, while the network layer (and all layers below the network layer) control communications between nodes of the network. The network layer protocols control the routing of information through the network, packet addressing, network initialization, packet switching, as well as segmenting and formatting of the information. The network layer function can be realized by using an international communications standard which prescribes the interface between a public packet-switched network and a communications system. Two such standards, defined in ISO/DIS 10598, "End System to Intermediate System Routing Exchange Protocol for Use in Conjunction With the Protocol for Providing the Connectionless-Mode Network Services (ISO 8473)", 1988, and ISO/DIS 10589, "Intermediate System to Intermediate System Intra-Domain Routing Protocol for Use in Conjunction With the Protocol for Providing the Conectionless-Mode Network Service (ISO 8473), 1990, prescribe the details of a packet-switched protocol to perform all of the network layer functions. Other network layer implementations are, of course, possible, but will not be described or further referred to here.

The next higher protocol layer above the network layer is called the transport layer and is represented by boxes 34 and 42 in FIG. 3. Transport layers 34 and 42 control the transparent data transfer, end-to-end control, multiplexing, data mapping, and so forth. Data delivery to the transport layer may, for example, imply reliable data reception or may imply only best efforts to deliver the data. Indeed, classes of reliability and delivery options may be selected at will by the user. For example, the highest reliability class could mean that the data will be transferred in a reliable manner and that all errors occurring at lower layers will be corrected at or below the transport layer. Lower classes of reliability could imply best efforts to deliver the data, the deletion of erroneous data or simply the delivery of data regardless of error.

The next higher protocol layer above the transport layer is called the session layer and is represented by boxes 33 and 41 in FIG. 3. The session layer protocols group pieces of information received from the transport layer into multi-packet groups associated with a given logical layer activity which can be referred to as a session. Sessions can exist between any two entities at any location in the network. Indeed, at any given time, a single node in the network can be involved in multiple sessions going to many other nodes, and many sessions can be multiplexed over the same network links. The session layer provides end-to-end coordinated delivery of data to a given logical activity without interference by data from other logical activities, even at the same layer of the same system.

The next higher protocol layer above the session layer is called the presentation layer and is represented by boxes 32 and 40 in FIG. 1. The presentation layer protocols interface the session layer to the application layer, presenting data to the application layer in a format suitable for use by the application layer without compromising the integrity of the session layer functions. The presentation layer provides data interpretation, format and code translation. The highest layer, the application layer, represented by boxes 31 and 38 in FIG. 3, provides the interface to the user applications and to system management functions above the highest communications layer.

In the OSI layered protocol of FIG. 3, the MAC-layer bridges operate at the data link layer represented by boxes 36 and 44 of FIG. 3. It is this low protocol layer level which makes bridge interconnections so efficient. It is to be noted that each interaction between adjacent layers of FIG. 3 requires the translation of information between the layer protocols. Routers, on the other hand, operate at the network layer represented by boxes 35 and 43 of FIG. 3. Routers are far more flexible than bridges, due to this higher (more abstract) protocol level, but are slower, more complicated, more difficult to create and maintain, and less efficient. In accordance with the present invention, only the connection initiation frames from a LAN are processed at the network layer of the OSI standard, and all of the data frames are processed at the data link layer. It is this difference which is referred to as "high-level signaling, low-level switching" in the context of the present invention. This concept can be better seen in connection with FIGS. 4 and 5.

Figure 4:
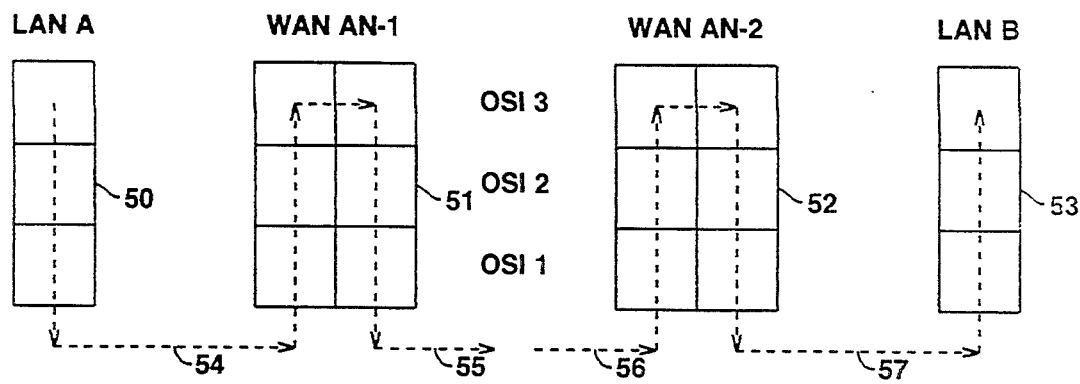
FIG. 4 shows a general block diagram of the OSI layer levels required for processing control frames in accordance with the present invention.

In FIG. 4 there is shown a schematic representation of the processing required for control frame processing in accordance with the present invention. In FIG. 4, block 50 corresponds to the protocol levels in a source LAN, block 53 corresponds to the protocol levels in a destination LAN and blocks 51 and 52 correspond to the protocol levels in WAN access nodes interfacing with blocks 50 and 53, respectively. Each of blocks 51 and 52 is divided into three layers corresponding, respectively, to the physical layer (OS 1), the data link layer (OS 2) and the network layer (OS 3) of FIG. 3. As suggested in FIG. 4, the processing of control frames in the system of the present invention begins in the network layer (OS 3) of the source LAN A, where the control frame request message is launched and flows down through the data link layer (OS 2) of LAN A, the physical layer (OS 1) of LAN A, and across the physical medium 54 to the access node 51 (WAN AN-1) of the wide area network. The control frame request message must flow up through the physical layer OS 1 and the data link layer OS 2 to the network layer OS 3 of node 51 where the control frame request message can be interpreted. This request message processing includes the invoking of directory services as outlined in connection with FIG. 2 and the launching of a resource query message across the WAN. The query message must then flow back down through the data link layer OS 2 and the physical layer OS 1 to the physical WAN internode medium 55.

After traversing the backbone WAN, the query message must be delivered from WAN internode physical medium 56 to the destination WAN access node 52 (WAN AN-2) which interfaces with the destination WAN. Again, at WAN access node 52, the query message must flow up through the physical layer OS 1 and the data link layer OS 2 to the network layer OS 3 for processing. A local query message is then formatted at this level (OS 3) and flows down through the data link layer OS 2 and the physical layer OS 1 to the physical medium 57 to the LAN B. At LAN B, the query message flows back up through physical layer OS 1 and data link layer OS 2 to the network layer OS 3 of the LAN B. Using the local directory resources, the destination end station is identified and a destination identification message is launched by the network layer OS 3 of the destination LAN B. This destination identification message retraces the same path in FIG. 4 to complete the initiation of the connection between the source and destination access agents.

Figure 5:
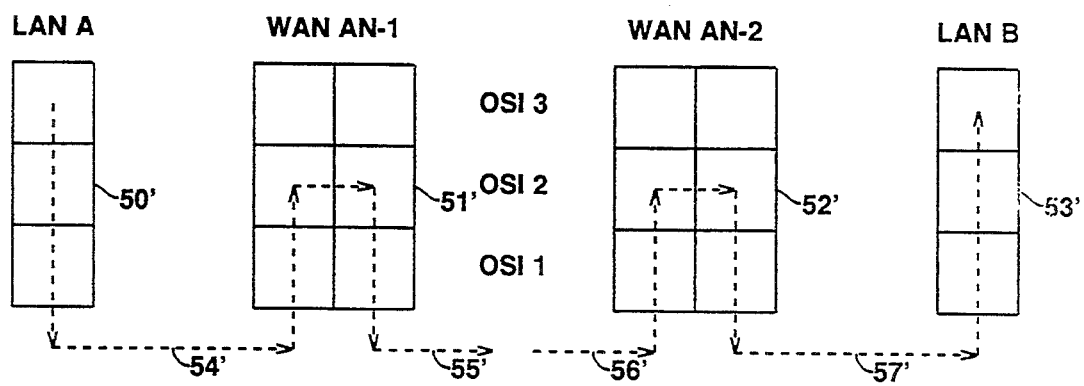
FIG. 5 shows a general block diagram of the OSI layer levels required for processing data frames in accordance with the present invention.

In FIG. 5 there is shown a similar OSI diagram of the data frame processing taking place in accordance with the present invention. A data frame originating at the network level OS 3 of block 50' of LAN A of FIG. 5 traverses data link layer OS 2 and physical layer OS 1 of block 50' to physical medium 54'. At WAN access agent 51', however, the data frame merely traverses physical layer OS 1 to the MAC layer of OS 2. Using the connection tables in the access agent 51', the data frame is forwarded directly across the WAN without invoking the network layer OS 3. It is this ability to forward the data frames without layer OS 3 processing which gives rise to the significantly increased efficiency of the interconnection system of the present invention. The data frame is eventually delivered to the LAN B block 53' and flows up through the physical layer OS 1 and the data link layer OS 2 to the network layer OS 3 of the LAN B where the data frame can be made use of by the user end station.

Figure 6:
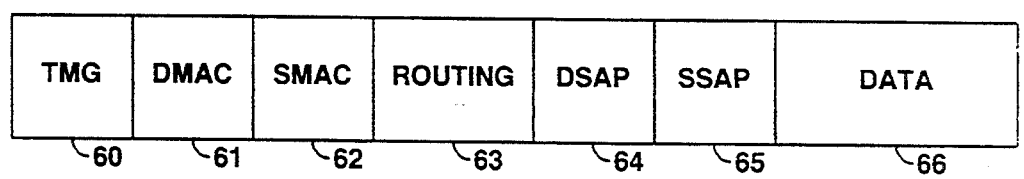
FIG. 6 shows a schematic diagram of a typical local area network data frame which might be transmitted between geographically separated local area networks by way of a wide area network in accordance with the present invention.

As previously noted, the WAN access nodes monitor the connected LANs to detect data and control frames for possible processing or forwarding across the wide area network. One format of such a data frame is illustrated in FIG. 6. The data frame of FIG. 6 comprises a timing field or preamble 60 which is used to by the receiver to synchronize the receiver clock and thus permit the identification of the remaining fields of the data frame. Field 61 comprises the MAC (media access control) address of the destination station. Field 62 is the MAC address of the source station. Field 63 contains, when appropriate, additional MAC layer routing information. Field 64 contains the service access point (SAP) for use at the destination while field 65 contains the SAP for the source location. These service access points are identifications of the appropriate interface points between the data link level and the network level at the source and destination nodes. Finally, the data field 66 contains the actual data to be delivered from the source to the destination. When used in the system of the present invention, it is the pair of source and destination MAC addresses 61 and 62 which identify the WAN connection to be used to move the data frame through the wide area network as discussed in connection with FIGS. 2 and 4.

Figure 7:
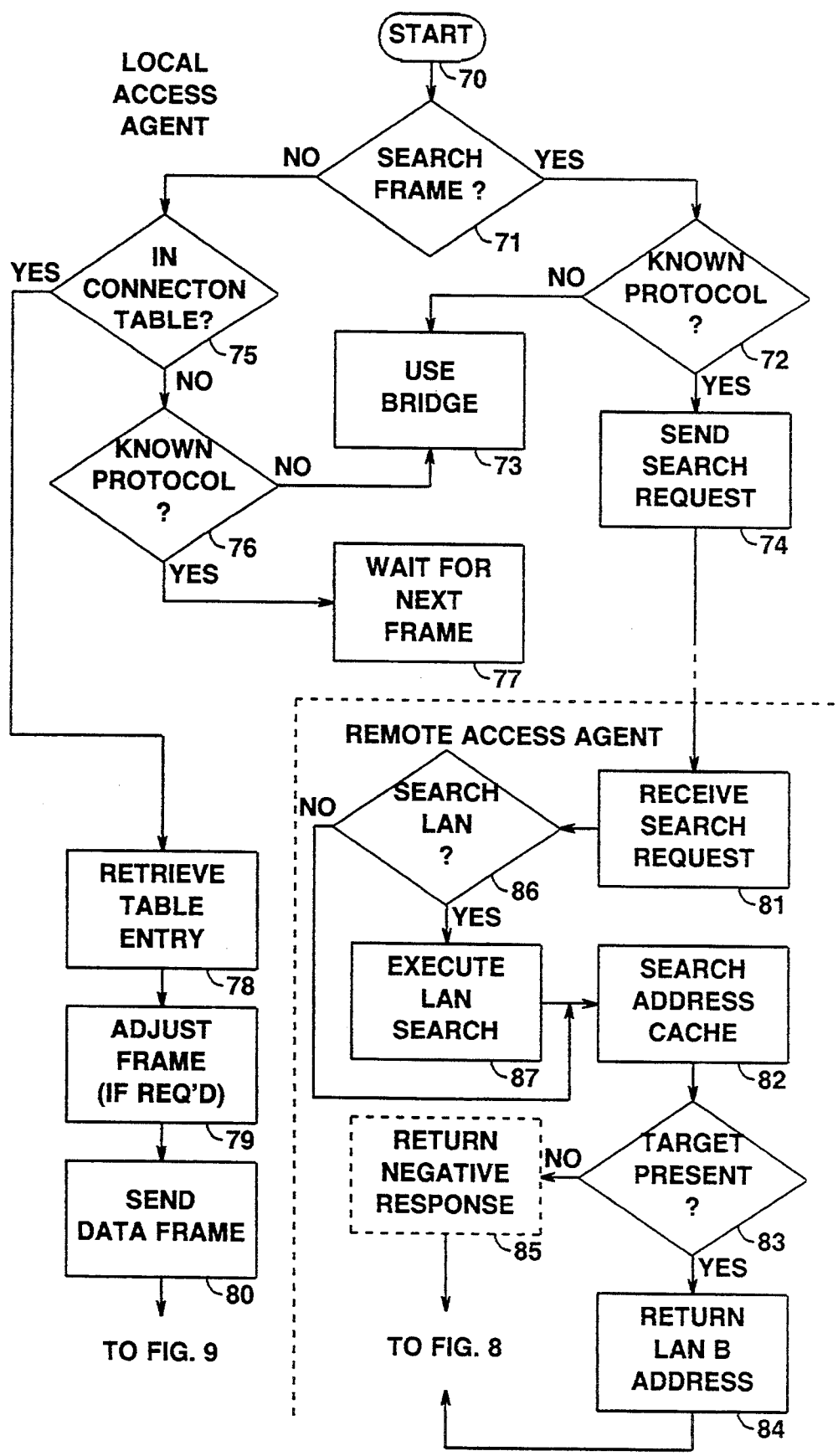
FIG. 7 is a flow chart of the procedures taking place in the access nodes of FIG. 1 of a wide area network in response to the arrival of a frame from a connected local area network in accordance with the present invention.
Figure 8:
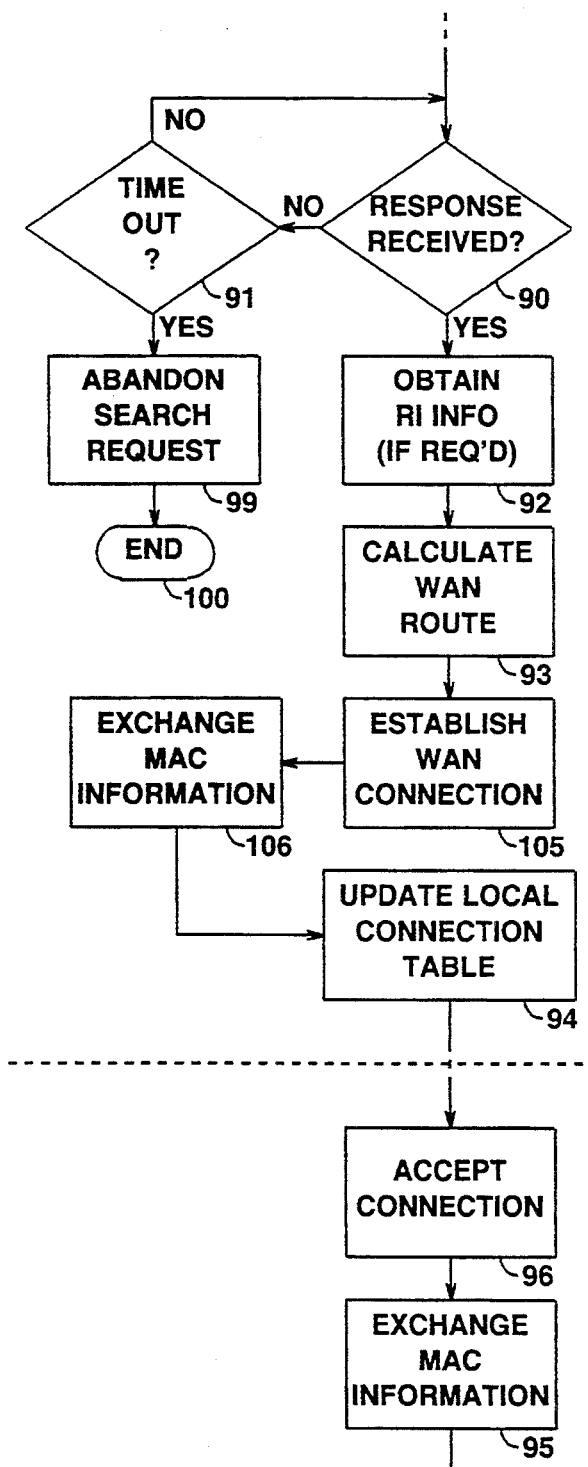
FIG. 8 is a flow chart of the procedures taking place in the access node of FIG. 1 in response to the arrival of a response from a remote access node of the wide area network in accordance with the present invention.
Figure 9:
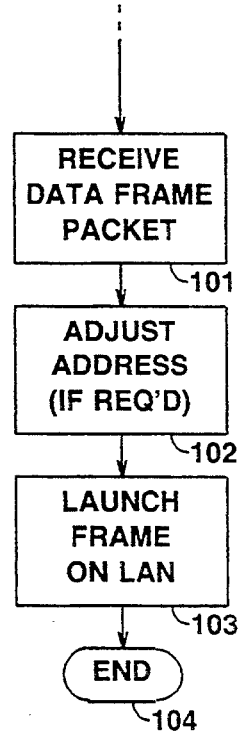
FIG. 9 is a flow chart of the procedures taking place in the access agents of FIG. 1 when a data frame is received at a remote access agent in accordance with the present invention.
Figure 10:
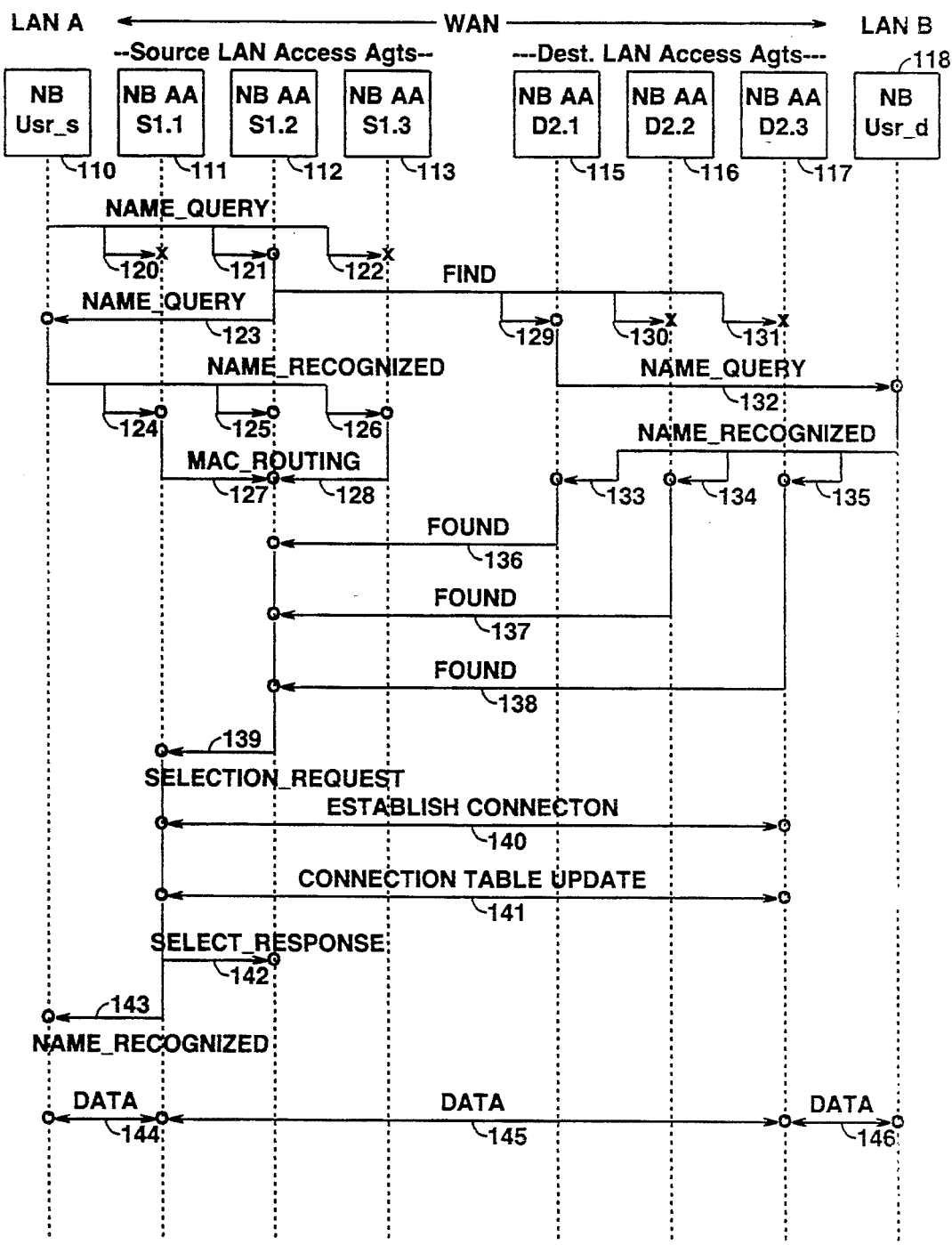
FIG. 10 shows a schematic time line diagram of the message exchanges necessary to set up a "NetBIOS" connection between two similar local area networks using the high level control and low level data exchange principles of the present invention.

A specific illustrative example of the implementation of the present invention is disclosed in the flow charts of FIGS. 7-9 and the message flow chart of FIG. 10. In FIG. 7 there is shown a flow chart of the procedures which take place in the local wide area network access agent when a local frame is received from the connected LAN. Starting in box 70, decision box 71 is entered where the frame is examined to determine whether the received frame is a control (search) frame or a data frame. If the received frame is a search frame, decision box 72 is entered to determine whether the protocol used in the search frame is known to this access agent. If not, the frame is simply bridged (in box 73) onto the wide area network, if such a function has been installed. Otherwise, a connection denial message can be returned to the local LAN.

If the protocol of the received search frame is known, as determined by decision box 72, box 74 is entered to create a search request for the identified destination and to launch the search request message onto the wide area network. This search request, of course, includes the prefix identifying the group of access agents which will recognize the destination address. The dotted line in FIG. 7 represents the separation between the WAN access agent at the source LAN (above and to the left of the dashed line) and the WAN access agent at the destination LAN (below and to the right of the dashed line). The search request message is received at each of a plurality of remote access agents in a box corresponding to box 81 in FIG. 7. The search request is passed on to decision box 86 where it is determined whether or not a search of the LAN directory services is required. If so, box 87 is entered where the LAN search is executed and the results are entered into the remote access agent's address cache 24. If no LAN search is required, as determined by decision box 86, or if a LAN search has already been executed, then box 82 is entered where the address cache at the remote access agent is searched for an entry corresponding to this search request. In decision box 83 it is determined whether or not a match is made with one of the entries in the remote address cache. If so, the MAC address of the local (LAN B) end station and the WAN transport address of the remote access agent are returned to the originating access agent, as will be shown in connection with FIG. 8. If the target end station is not found in the connection tables, as determined by decision box 83, the box 85 is entered to return a negative response to the search request. Box 85 is shown in dashed lines to indicate that it is not necessary to return a negative response, and that only positive responses are needed to carry out the searching procedure, relying on a time out at the source access agent as will be described in connection with FIG. 8.

Returning to decision box 71, if it is determined that the received frame is not a search frame, the frame is a data frame and decision box 75 is entered to determine if the source and destination address pair of MAC addresses in the header of the data frame is in the local connection tables. If the address pair is in the local connection tables, box 78 is entered to retrieve that connection table entry and, in box 79, adjust the format and/or contents of the data frame (encapsulate the data frame) in accordance with the connection table entry. Such adjustments may, in some cases, not be required if the data frame is already in an acceptable format. Box 80 is then entered to transmit the data frame across the wide area network to the access agent at the remote end of the identified WAN connection.

It will be noted that distinctively different processing paths are followed in FIG. 7 for search (control) frames and for data frames. More importantly, the search frame processing requires bilateral interactions with the remote access agents whereas the data frame processing merely requires the launching of the adjusted data frame. It is this divergency which gives rise to the many advantages of applicants' invention.

In FIG. 8 there is shown a flow chart of the procedures followed when a response is received to a previously launched search request message sent from this access agent. In decision box 90 it is determined whether or not such a response has been received. If not, decision box 91 is entered to determine if a time out period has expired. If not, decision box 90 is re-entered to await a response. If no response is received within the time out period, decision box 91 is eventually exited with a decision that the time out period has expired. Box 99 is entered in which the search request is then abandoned and the procedure terminated in box 100. This time out procedure ensures that the source access agent does not continue to tie up its resources in waiting for responses that may never come. The source access agent can then launch a message on the local LAN indicating its failure to make the connection. As previously noted, this time out procedure is an alternative or a supplement to the response from box 85 of FIG. 7.

If a response to the search request message is received, as determined by decision box 90, box 92 is entered to obtain the MAC layer routing information, if any, from the search response message. In box 93 this information is used to calculate an appropriate wide area network route for packets between this source access agent and the remote destination access agent. This route can be calculated from topology and existing traffic information stored at the access agent, augmented, when available, with routing information returned in the search response message. In box 105, the actual WAN connection is established, using the connection establishment procedures of the WAN. In box 106, this WAN connection is used to exchange the MAC layer address information between the two LAN access agents to establish new connection table entries. In box 94, the local connection table for this connection is updated with the received information. At the remote access agent, below the dashed line in FIG. 8, the connection from the source agent is accepted in box 96 and, in box 99, the MAC information is exchanged with the local access agent and, in box 97, this information is used to update the connection tables at the remote location with all of the routing information necessary to exchange data frames between the access agents. The procedure of FIG. 8 terminates in box 98.

In FIG. 9 there is shown a flow chart of the procedures taking place at the remote access agent when a data packet, with the proper heading, is received at the remote access agent (after being launched from the local access agent as described in connection with FIG. 7). In box 101 the data packet is received at the remote access agent and, in box 102, the MAC address in the header of the data frame adjusted, if necessary, to accommodate the protocols of the local LAN. The information necessary to make these adjustments is the very same information previously loaded into the remote connection tables by the routing and target address message as described in connection with FIG. 8. In FIG. 9, the data frame with the adjusted header address is launched, in box 103, on the local LAN. The procedure of FIG. 9 terminates in box 104. The local LAN, of course, delivers the data frame to the intended end station, using the adjusted MAC address to assure proper delivery.

It is to be understood that search requests and data frames can be received at any access agent from a local LAN and, indeed, a plurality of access agents can be provided for each LAN to insure prompt servicing of search requests. Different access agents at a single geographical location can be designed to handle different local protocols and, indeed, new LAN protocols can be accommodated merely by adding new access agents whenever the new protocols are to be serviced by the backbone WAN.

In FIG. 10 there is shown a specific example of the implementation of the present invention using schematic time lines and message transmittal lines and represents the chain of events which take place to interconnect LAN user stations on different LANs, using a WAN backbone network. In FIG. 10, the boxes at the top represent devices or software corresponding to LAN user stations (110 and 118) and WAN access agents (111–113 and 115–117). The vertical dashed lines emanating from boxes 110–118 represent time lines on which time increases in a downward direction. The horizontal lines and arrows 120–146 represent messages transmitted between the boxes 110–118 in the sequence indicated by the vertical dashed time lines. These messages are delivered at the arrow heads to the time lines corresponding to one of boxes 111–118. If the arrow is terminated at a "0," the message is accepted by the corresponding box. If the arrow terminates in an "X," the message is not processed further by the corresponding box. More particularly, box 110 represents schematically a source user station in the local area network A. Boxes 111–113 represent WAN access agents accessible to LAN A. Boxes 115–117 represent WAN access agents accessible to LAN B. Finally, box 118 represents a destination user station in the local area network B.

In general, a source access agent receives a request from a connected LAN to connect a station on that LAN to a station on another, remote LAN. The address of the remote station in the request is converted, in part, into a globally unique address prefix for a group of connected LANs which should be searched to locate the destination station. Using directory services 22, a message is multicast across the WAN to the group of LAN access agents which will recognize the address prefix, using the address prefix as a group selector. One access agent at each remote LAN of this group tries to locate the pertinent destination user station, using local LAN search procedures. Once located, a connection is established between the successful destination access agent and the source access agent for the exchange of data frames. The two access agents then perform a reliable message exchange to create connection table entries at both access agents which map the pertinent LAN MAC-layer address information into the previously established WAN data connection. Subsequent data frames from either end of the connection use these connection table entries to deliver these data frames between the LAN stations, using the backbone WAN. For illustrative purposes, the illustration will assume that a NetBIOS connection is to be established between two interconnection source-routing LANs. The NetBIOS architecture is described in "Local Area Network—Technical Reference," IBM Technical Document SC30-3383, 1988. Only minor variations in these procedures are necessary to utilize these procedures for other LAN architectures and protocols.

Proceeding sequentially down the time lines of FIG. 10, a search message is launched from user 110 in LAN A and delivered, via arrows 120, 121 and 122, respectively, to WAN access agents 111, 112 and 113. In the NetBIOS example, this search message is a NAME_QUERY frame which includes the NetBIOS source address and NetBIOS destination address and is broadcast to all stations on LAN A. The NAME$_{13}$ QUERY frame also includes a correlator value used for the NetBIOS names services protocols, and the destination NetBIOS name as specified by the user in the CallName of the NCB. Call command in accordance with the previously cited NetBIOS article. The WAN access agents 111-113 monitor LAN A to detect the NAME_QUERY frame. The NAME_QUERY frame is delivered to the protocol components (component 18, FIG. 2) of access agents 111-113 which establish appropriate cache entries for the local NetBIOS source in the address cache 24 (FIG. 2), if one does not already exist. Using any suitable protocol, one and only one of the connected access agents (112 in FIG. 10) is selected to proceed with the search and the other local access agents (111 and 113) discard the NAME_QUERY frame, but retain knowledge of the search procedure in progress. All of the access agents (111-113) start a time out timer to limit the duration of the search procedure.

The protocol component 18 of the selected access agent 112 transmits a scout NAME_QUERY message 123 back to the source station 110 identifying the selected access agent 112 and soliciting a NAME_RECOGNIZED response 124-126 from the originating station. The NAME_RECOGNIZED response 124-126 may include additional optimal routing information through the local LAN A, if available. A zero session number on NAME_QUERY message 123 indicates that this message is for locating purposes only, and that no connection establishment is intended. The source station 110 responds with a broadcast NAME_RECOGNIZED message 124-126 which is also received by the non-selected access agents 111 and 113. These agents inform the selected access agent 112 of the MAC-layer routing information they received which can then be used for later optimization of the end-to-end path (127, 128). Such local route optimization is optional and is not required to achieve the major benefits of the present invention. The non-selected access agents 124 and 126 also receive the NAME_RECOGNIZED message 124 and 126 and discard it.

The designated access agent 112 requests directory services to locate a destination resource identified by a pre-defined prefix (VNETID) followed by the NetBIOS destination station address. The VNETID prefix identifies the group of LAN access agents which share the same NetBIOS characteristics and which can be interconnected across the WAN backbone. It is further assumed that prior to the depicted message flows, each of the LAN access agents attached to any such LAN has already registered the VNETID prefix with directory services. Assuming that this destination address does not match any local station cache entry, directory services (22, FIG. 2) distributes a WAN search frame 129, 130, 131 (FIG. 10), called FIND, to all access agents previously registered as members of the VNETID prefix group. The FIND search message is distributed on the backbone WAN using the standard multicasting facilities available on the WAN and implemented in transport services 23 (FIG. 2).

The remote access agents 115-117, among others, receive the FIND message and establish cache entries in the address cache for remote resources. Again, using an appropriate selection protocol, one (115) of the access agents is selected to proceed with the search. The non-selected access agents (116, 117) discard the FIND message but retain knowledge of the procedure in progress. The selected access agent 115 launches a NAME_QUERY message 132 on LAN B which solicits a NAME_RECOGNIZED response from the destination user station. This NAME_RECOGNIZED message is delivered, via arrows 133, 134 and 135, to each of access agents 115, 116 and 117 and cache entries are created in their respective address caches, if no such entry already exists.

All of the remote access agents 115-117 that received the FIND message 129-131 transmit a FOUND message 136-138 to the designated local access agent 112. The FOUND message 136-138 includes the WAN transport address of the originating remote access agent and the MAC (media access control) address of the destination station as well as other MAC-layer routing information, if present. It is therefore possible for the designated local access agent 112 to choose between the available data paths based on some desirable criteria. Using some suitable algorithm, the designated access agent 112 selects yet another local access agent (e.g., access agent 111 ) and yet another remote access agent (e.g., access agent 117) which together provide the most optimum data path between the source and the destination LAN user station. The finally selected local access agent is notified via a SELECTION_REQUEST message 139 and notifies the selected remote access agent 117 via an ESTABLISH_CONNECTION message handshake 140. Together, the finally selected access agents 111 and 117 are called the data path access agents. A reliable CONNECTION_TABLE_UPDATE message handshake 141 synchronizes the necessary entries in the connection tables for subsequent data frames to use, e.g. the MAC-layer header information.

When the data path has been set up by the procedures described above, the source data path access agent 111 sends a SELECT_RESPONSE message 142 to the previously designated local access agent 112 to acknowledge that the SELECT_REQUEST message 139 was successfully processed and that access agent 112 may now discard the information relating to this request. The protocol component 18 (FIG. 2) of the source data path access agent 111 then transmits a NAME_RECOGNIZED message 143 back to the source user station, using the parameters supplied from the remote end station 118, thereby completing the end-to-end connection establishment. All subsequent data exchanges 144-146 of the NetBIOS connection are transmitted as point-to-point LAN frames which are fully encapsulated across the WAN by the relay component 20, using the connection table 19 entries. These subsequent exchanges include the SESSION_INITIALIZE and SESSION_CONFIRM frames as well as the actual connection data.

It is important to note that the LAN prefix groups used to distribute directory searches can be adopted dynamically from the user structured addresses or can be administratively defined via pertinent registration information in the directory services components of the respective access agents on the WAN. That is, LAN access agents with the same LAN protocols and address prefixes form multicast WAN groups represented by the specific prefixes. The formation and disassociation of such administrative groups requires little overhead in the management of the backbone WAN.

It is possible with the system of the present invention to interconnect LAN stations across the WAN with the same degree of connectivity available with prior art routers and, at the same time, provide steady-state data paths which require only MAC-layer-like bridge operations on the data frames received from the attached LANs.

It should also be clear to those skilled in the art that further embodiments of the present invention may be made by those skilled in the art without departing from the teachings of the present invention.

What is claimed is:

1. An interconnection system for interconnecting a plurality of local area data communications networks by means of a single wide area point-to-point data communications network, said wide area data communications network using the open systems interconnection layered protocols including a network layer and a data link layer, said interconnecting system comprising a plurality of access nodes in said wide area network for accessing said wide area network from a plurality of local area networks, means in each of said access nodes for receiving a signaling frame in said network layer from an originating one of said local area networks and intended for a destination one of said local area networks, means in the network layer in each of said access nodes responsive to said signalling frame receiving means for determining if said destination local area network has transmission protocols compatible with the transmission protocols at said originating local area network, means in each of said access nodes responsive to said means in the network layer for adjusting data frames from one of said local area communications networks, the adjustment being at least in part a function of an output from said means in the network layer, to permit transmission through said wide area network, and means in the data link layer in each of said access nodes responsive to said adjusting means for forwarding adjusted data frames across said wide area network.

2. The interconnection system according to claim 1 further comprising means in each of said access nodes utilizing destination address prefixes for associating local area network addresses with compatible local area network protocols.

3. The interconnection system according to claim 2 wherein said associating means includes means for taking an address prefix from said signaling frame.

4. The interconnection system according to claim 2 wherein said associating means includes means for determining said prefixes administratively by said network layer means.

5. The interconnection system according to claim 1 wherein said adjusting means comprises connection tables in each of said access nodes for storing translation information for translating data frames to be transmitted between each of said local area networks and said wide area network.

6. The interconnection system according to claim 1 further comprising directory services means in each of said access nodes for registering support for the interconnection of local area networks connected to said wide area network.

7. The interconnection system according to claim 1 further comprising protocol components in each of said access nodes for processing signaling frames from said local area networks, and relay components in each of said access nodes for processing data frames from said local area networks.

8. A method for interconnecting a plurality of local area data communications networks by means of a single point-to-point wide area data communications network, said wide area data communications network using the open systems interconnection layered protocols including a network layer protocol and a data link layer protocol, said method comprising the steps of accessing said wide area network by said local area networks through a plurality of access nodes, receiving, in said network layer of said access node, a signaling frame from an originating one of said local area networks and intended for a destination one of said local area networks, determining if said destination local area network has transmission protocols compatible with the transmission protocols of said originating local area network, creating, in said access node, a data frame adjusting means for adjusting data frames from one of said local area communications networks to permit transmission through said wide area network, and forwarding, in said data link layer, adjusted data frames across said wide area network, utilizing said data frame adjusting means.

9. The method according to claim 8 further comprising the step of utilizing, in said access node, destination address prefixes for associating local area network addresses with compatible local area network protocols.

10. The method according to claim 9 further comprising the step of taking said address prefix from said signaling frame.

11. The method according to claim 9 further comprising the step of determining said address prefix administratively.

12. The method according to claim 8 wherein said step of adjusting comprises the steps of creating connection tables in each of said access nodes for storing translation information for translating data frames to be transmitted between each of said local area networks and said wide area network, and adjusting said data frames with said connection tables.

13. The method according to claim 8 further comprising the steps of registering support for the interconnection of local area networks connected to said wide area network in a directory services component in said access nodes, and utilizing said directory services component in said step of creating a data frame adjusting means.

14. The method according to claim 8 further comprising the steps of processing signaling frames from said local area networks by a protocol component in the network layer level of said access nodes of said wide area network, and processing data frames from said local area networks by a relay component in the data link layer of said wide area network.

* * * * *